US011926696B2

(12) United States Patent
Metzger et al.

(10) Patent No.: US 11,926,696 B2
(45) Date of Patent: Mar. 12, 2024

(54) FUNCTIONALIZED LOW MOLECULAR WEIGHT STERICALLY ENCUMBERED OLIGOMERS

(71) Applicant: ExxonMobil Chemical Patents Inc., Baytown, TX (US)

(72) Inventors: Eric D. Metzger, Houston, TX (US); Mika L. Shiramizu, Houston, TX (US); Brian J. Rohde, Houston, TX (US); Alan A. Galuska, Ellijay, GA (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 228 days.

(21) Appl. No.: 17/165,356

(22) Filed: Feb. 2, 2021

(65) Prior Publication Data

US 2021/0253784 A1   Aug. 19, 2021

Related U.S. Application Data

(60) Provisional application No. 62/975,391, filed on Feb. 12, 2020.

(51) Int. Cl.
*C08G 61/08* (2006.01)
*B01J 31/22* (2006.01)
(Continued)

(52) U.S. Cl.
CPC .......... *C08G 61/08* (2013.01); *B01J 31/2278* (2013.01); *C08F 2/38* (2013.01); *C08F 232/04* (2013.01);
(Continued)

(58) Field of Classification Search
CPC .............................. C08G 61/08; C08G 61/06; C08G 2261/3324; C08G 2261/3325; C08G 2261/418; C08F 2/38
See application file for complete search history.

(56) References Cited

U.S. PATENT DOCUMENTS 5,190,808 A * 3/1993 Tenney .................. H05K 1/032
428/209
6,232,417 B1 * 5/2001 Rhodes ................. G03F 7/0045
526/309
(Continued)

FOREIGN PATENT DOCUMENTS

JP     2000-336152      12/2000 ............. C08G 61/08

OTHER PUBLICATIONS

Spanka, Carsten et al, "Developing Soluble Polymers for High-Throughput Synthetic Chemistry" 2002, Combinatorial Chemistry and High Throughput Screening, 5, p. 233-240 (Year: 2002).*
(Continued)

*Primary Examiner* — Ling Siu Choi
*Assistant Examiner* — David L Miller

(57) ABSTRACT

Low molecular weight, high Tg resins, with applications including tire additives and adhesives. An oligomer is obtained by ring opening metathesis polymerization (ROMP) of a sterically encumbered cyclic monomer with an olefinic chain transfer agent. The sterically encumbered cyclic monomer and the olefinic chain transfer agent are present in the polymerization at a molar ratio of from 2:1 to about 40:1. Also, methods for making the oligomer by ROMP.

18 Claims, 2 Drawing Sheets

(51) Int. Cl.
*C08F 2/38* (2006.01)
*C08F 232/04* (2006.01)
*C08F 232/08* (2006.01)
*C08G 61/06* (2006.01)

(52) U.S. Cl.
CPC ....... *C08F 232/08* (2013.01); *B01J 2531/821* (2013.01); *C08G 61/06* (2013.01); *C08G 2170/00* (2013.01); *C08G 2261/226* (2013.01); *C08G 2261/228* (2013.01); *C08G 2261/3324* (2013.01); *C08G 2261/3325* (2013.01); *C08G 2261/418* (2013.01); *C08G 2380/00* (2013.01)

(56) References Cited

U.S. PATENT DOCUMENTS

| | | | |
|---|---|---|---|
| 6,864,325 B2 | 3/2005 | Zedda et al. | 525/332.1 |
| 7,608,671 B2 | 10/2009 | Hayano et al. | 525/338 |
| 2005/0148746 A1* | 7/2005 | Taguchi | C08G 61/08 |
| | | | 526/282 |
| 2009/0221750 A1* | 9/2009 | Tsunogae | C08G 61/08 |
| | | | 525/97 |
| 2009/0297870 A1 | 12/2009 | Takeyama et al. | 428/523 |

OTHER PUBLICATIONS

Wypych, George, "PN polynorbornene" Handbook of polymers (Second Edition) ChemTec Publishing 2016 p. 482-484 accessed on Mar. 3, 2023 at https://www.sciencedirect.com/science/article/pii/B978189519892850152X (Year: 2016).*

U.S. Appl. No. 62/937,344, filed Nov. 19, 2019, Shiramizu, Mika L. et al.
U.S. Appl. No. 17/067,256, filed Oct. 9, 2020, Culcu, Gursu et al.
U.S. Appl. No. 62/914,222, filed Oct. 11, 2020, Culcu, Gursu et al.
U.S. Appl. No. 62/975,385, filed Feb. 12, 2020, Metzger, Eric D. et al.

Hayano, S. et al. (2014) "Iso- and Syndio-Selective ROMP of Norbene and Tetracyclododecene: Effects of Tacticity Control on the Hydrogenated Ring-Opened Poly(cycloolefin)s," *Macromolecules*, v. 47, pp. 7797-7811.

Kim, J. et al. (2010) "Ring-Opening Metathesis Polymerization of Tetracyclododecene using Various Catalyst Systems," *Journal of Applied Polymer Science*, v.116, pp. 479-485.

* cited by examiner

FUNCTIONALIZED LOW MOLECULAR WEIGHT STERICALLY ENCUMBERED OLIGOMERS

CROSS-REFERENCE TO RELATED APPLICATIONS

This application claims the priority benefit of US Provisional Application No. 62/975,391, filed Feb. 12, 2020, the disclosure of which is incorporated herein by reference.

FIELD OF THE INVENTION

The present disclosure relates to functionalized, low molecular weight oligomers, and in particular to silane or glycidyl modified oligomers derived from ring opening metathesis polymerization of monomers including sterically encumbered cyclic monomers.

BACKGROUND

There is a large demand for low-molecular weight (MW), high-glass transition temperature (Tg) resins for applications in adhesives, sealants, tire additives, and the like, e.g., materials having number average MW (Mn) less than 10,000, Tg equal to or greater than 40° C., and which are useful as Tg modifiers in, for example, tread formulations. Functionalized versions are particularly desired for reactive adhesives. Also needed is a flexible method to prepare the resins with tailored properties to improve filler interactions and/or optimize tire performance.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Disclosed herein is a versatile platform by which low Mn oligomeric materials may be prepared via the ring opening metathesis polymerization (ROMP) of sterically encumbered cyclic monomers such as tetracyclododecene (TCD), norbornene, dicyclopentadiene, dihydrodicyclopentadiene, tricyclopentadiene, dihydrotricyclopentadiene, tetracyclopentadiene, dihydrotetracyclopentadiene, norbornene ethyl siloxane, norbornene anhydride, and so on. During the ROMP reaction, the chain length of the resulting resin can be controlled via the addition of variable amounts of a monomeric chain transfer agent (CTA). If desired, the resins can be functionalized in a variety of methods, including the incorporation of functionalized monomers or the use of functionalized chain transfer agents. Overall, this methodology allows the versatile preparation of a platform of resins that can potentially address market needs within tire additives and reactive adhesives.

In one aspect of the disclosure, a composition of matter comprises a functionalized oligomer obtained by ring opening metathesis polymerization (ROMP) of a sterically encumbered cyclic monomer with an olefinic chain transfer agent at a molar ratio of from 3:1 to about 40:1, wherein the functionalized oligomer has the formula:

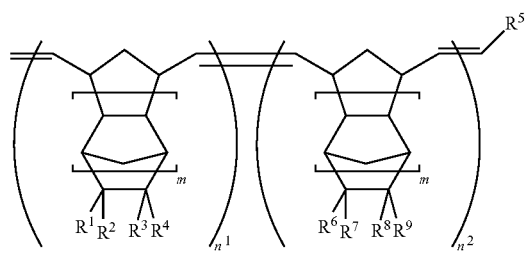

wherein $n^1$ is from 1 to about 40;
wherein $n^2$ is 0 (optional) or from 1 to about 5;
wherein a sum of $n^1+n^2$ is from 2 to about 40;
wherein $m^1$ and $m^2$ are independently 0 or an integer of 1 or more;
wherein $R^1$, $R^2$, $R^3$, and $R^4$ are independently hydrogen, a $C_1$-$C_{20}$ hydrocarbyl group, or a combination thereof, or two or more of $R^1$ to $R^4$ may independently join together to form a cyclic or polycyclic ring structure;
wherein $R^5$ is a $C_1$-$C_{40}$ hydrocarbyl group optionally comprising a functional group containing halogen or a Group 15 or 16 heteroatom or silicon or germanium or tin or lead;
wherein, when $n^2$ is 0, $R^5$ comprises the functional group;
wherein, when $n^2$ is nonzero, $R^6$, $R^7$, $R^8$, and $R^9$ are independently hydrogen; a functional group containing a halogen or a Group 15 or 16 heteroatom or silicon or germanium or tin or lead; a $C_1$-$C_{20}$ hydrocarbyl group optionally comprising the functional group; or a combination thereof; or two or more of $R^6$ to $R^9$ may independently join together to form a cyclic or polycyclic ring structure; provided at least one of $R^5$ to $R^9$ comprises the functional group.

In another aspect of the disclosure, a process for preparing a functionalized oligomer comprises: contacting a sterically encumbered cyclic monomer with a ring opening metathesis polymerization (ROMP) catalyst in the presence of an olefinic chain transfer agent at a molar ratio of sterically encumbered cyclic monomer to olefinic chain transfer agent from 2:1 to about 40:1 at conditions to form the oligomer, wherein the sterically encumbered cyclic monomer comprises a functionalized comonomer and/or wherein the olefinic chain transfer agent is functionalized; and recovering the functionalized oligomer.

DETAILED DESCRIPTION

Figure 1:
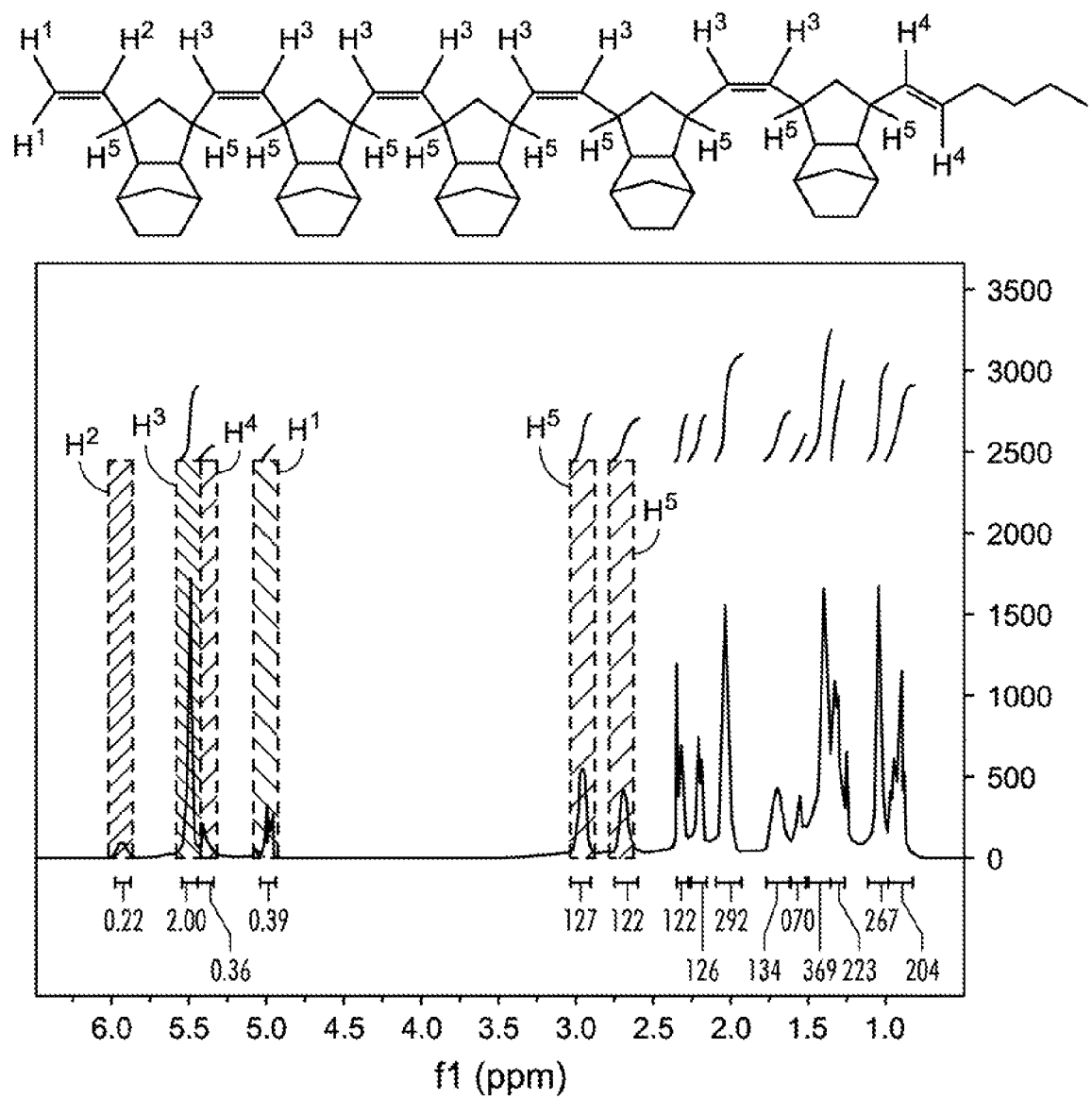
FIG. 1 is a $^1$H NMR analysis of the resulting resin from Run 1-1 according to an example of the present invention.

The term "alkyl" or "alkyl group" interchangeably refers to a saturated hydrocarbyl group consisting of carbon and hydrogen atoms. An alkyl group can be linear, branched, cyclic, or substituted cyclic.

The term "cycloalkyl" or "cycloalkyl group" interchangeably refers to a saturated hydrocarbyl group wherein the carbon atoms form one or more ring structures.

The term "aryl" or "aryl group" interchangeably refers to a hydrocarbyl group comprising an aromatic ring structure therein.

For the purposes of this disclosure and the claims thereto, the new numbering scheme for the Periodic Table Groups is used as in HAWLEY'S CONDENSED CHEMICAL DICTIONARY (13$^{th}$ ed, John Wiley & Sons, Inc., 1997). Therefore, a "Group 4 metal" is an element from Group 4 of the Periodic Table.

Unless otherwise indicated, a substituted group means such a group in which at least one atom is replaced by a different atom or a group. Thus, a substituted alkyl group can be an alkyl group in which at least one hydrogen atom is replaced by a hydrocarbyl group, a halogen, any other non-hydrogen group, and/or a least one carbon atom and hydrogen atoms bonded thereto is replaced by a different group. Preferably, a substituted group is a radical in which at least one hydrogen atom has been substituted with a heteroatom or heteroatom containing group, preferably with at least one functional group, such as halogen (Cl, Br, I, F), NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$, and the like or where at least one heteroatom has been inserted within the hydrocarbyl radical, such as halogen (Cl, Br, I, F), O, S, Se, Te, NR*, PR*, AsR*, SbR*, BR*, SiR*$_2$, GeR*$_2$, SnR*$_2$, PbR*$_2$, and the like, where R* is, independently, hydrogen or a hydrocarbyl.

For purposes herein, "heteroatom" refers to non-metal or metalloid atoms from Groups 13, 14, 15 and 16 of the periodic table, typically which supplant a carbon atom. For example, pyridine is a heteroatom containing form of benzene. Halogen refers to atoms from group 17 of the periodic table.

The terms "hydrocarbyl radical," "hydrocarbyl group," or "hydrocarbyl" interchangeably refer to a group consisting of hydrogen and carbon atoms only. A hydrocarbyl group can be saturated or unsaturated, linear, branched, cyclic or acyclic, aromatic or non-aromatic.

Substituted hydrocarbyl radicals are radicals in which at least one hydrogen atom has been substituted with a heteroatom or heteroatom containing group, preferably with at least one functional group, such as halogen (Cl, Br, I, F), NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$, and the like or where at least one heteroatom has been inserted within the hydrocarbyl radical, such as halogen (Cl, Br, I, F), O, S, Se, Te, NR*, PR*, AsR*, SbR*, BR*, SiR*$_2$, GeR*$_2$, SnR*$_2$, PbR*$_2$, and the like, where R* is, independently, hydrogen or a hydrocarbyl.

In some embodiments, the hydrocarbyl radical is independently selected from methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl. Also included are isomers of saturated, partially unsaturated and aromatic cyclic structures wherein the radical may additionally be subjected to the types of substitutions described above. Examples include phenyl, methylphenyl, benzyl, methylbenzyl, naphthyl, cyclohexyl, cyclohexenyl, methylcyclohexyl, and the like. For this disclosure, when a radical is listed, it indicates that radical type and all other radicals formed when that radical type is subjected to the substitutions defined above. Alkyl, alkenyl, and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (and cyclobutenyls and cyclopropenyls). Cyclic compound having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

The term "$C_n$" group or compound refers to a group or a compound comprising carbon atoms at total number thereof of n. Thus, a "$C_m$-$C_n$" group or compound refers to a group or compound comprising carbon atoms at a total number thereof in the range from m to n. Thus, a $C_1$-$C_{50}$ alkyl group refers to an alkyl group comprising carbon atoms at a total number thereof in the range from 1 to 50.

The term "olefin," alternatively termed "alkene," refers to an unsaturated hydrocarbon compound having a hydrocarbon chain containing at least one carbon-to-carbon double bond in the structure thereof, wherein the carbon-to-carbon double bond does not constitute a part of an aromatic ring. The olefin may be linear, branched, or cyclic.

For purposes of this specification and the claims appended thereto, when a polymer or copolymer is referred to as comprising an olefin, including, but not limited to ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Thus, an "olefin" is intended to embrace all structural isomeric forms of olefins, unless it is specified to mean a single isomer or the context clearly indicates otherwise. An oligomer is a polymer having a low molecular weight, such as an Mn of 21,000 g/mol or less (preferably 10,000 g/mol or less), and/or a low number of mer units, such as 100 mer units or less (preferably 75 mer units or less).

The term "cyclic olefin" refers to any cyclic species comprising at least one ethylenic double bond in a ring. The atoms of the ring may be optionally substituted. The ring may comprise any number of carbon atoms and/or heteroatoms. In some cases, the cyclic olefin may comprise more than one ring. A ring may comprise at least 3, at least 4, at least 5, at least 6, at least 7, at least 8, or more, atoms.

Non-limiting examples of cyclic olefins include cyclopentene, cyclohexene, norbornene, dicyclopentadiene, bicyclo compounds, oxabicyclo compounds, and the like, all optionally substituted. "Bicyclo compounds" are a class of compounds consisting of two rings only, having two or more atoms in common.

Unless specified otherwise, the term "substantially all" with respect to a molecule refers to at least 90 mol % (such as at least 95 mol %, at least 98 mol %, at least 99 mol %, or even 100 mol %).

Unless specified otherwise, the term "substantially free of" with respect to a particular component means the concentration of that component in the relevant composition is no greater than 10 mol % (such as no greater than 5 mol %, no greater than 3 mol %, no greater than 1 mol %, or about 0%, within the bounds of the relevant measurement framework), based on the total quantity of the relevant composition.

The terms "catalyst" and "catalyst compound" are defined to mean a compound capable of initiating catalysis and/or of facilitating a chemical reaction with little or no poisoning/consumption. In the description herein, the catalyst may be described as a catalyst precursor, a pre-catalyst compound, or a transition metal compound, and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. A "catalyst system" is combination of at least one catalyst compound, at least one activator, an optional co-activator, and an optional support material, where the system can polymerize monomers to form polymer.

All numerical values within the detailed description and the claims herein are modified by "about" or "approximately" the indicated value, and take into account experimental error and variations that would be expected by a person having ordinary skill in the art.

In the present disclosure, unless specified otherwise, percent refers to percent by weight, expressed as "wt %."

In the present disclosure, all molecular weight data are in the unit of g·mol$^{-1}$. Unless indicated otherwise, Mw, Mn and Mw/Mn are determined by using high temperature gel permeation chromatography with a differential refractive index detector (DRI). Three high temperature TSK gel columns such as TOSOH GMHHR-H(20)HT2 are used. The nominal flow rate is 1.0 mL/min, and the nominal injection volume is 300 µL. The various transfer lines, columns, and dual flow differential refractometer (the DRI detector) are contained in an oven maintained at 160° C. Solvent for the experiment is prepared by dissolving 1.2 grams of butylated hydroxytoluene as an antioxidant in 4 liters of reagent grade 1, 2, 4 trichlorobenzene (TCB). The TCB mixture is then filtered through a 0.1 µm TEFLON® filter. The TCB is then degassed with an online degasser before entering the GPC instrument. Polymer solutions are prepared by placing dry polymer in glass vials, adding the desired amount of TCB, then heating the mixture at 160° C. with continuous shaking for about 1 hours. All quantities are measured gravimetrically. The injection concentration is from 0.5 to 1.0 mg/mL, with lower concentrations being used for higher molecular weight samples. Flow rate in the apparatus is then increased to 1.0 mL/minute, and the DRI is allowed to stabilize for 2 hours before injecting the first sample. The molecular weight is determined relative to polystyrene molecular weight that the column calibration is performed with a series of monodispersed polystyrene standards. All molecular weights are reported in g/mol unless otherwise noted.

The polydispersity index (PDI), also referred to as the molecular weight distribution (MWD), of the material is then the ratio of Mw/Mn.

For purposes herein, the melting temperature (Tm), crystallization temperature (Tc), glass transition temperature (Tg), etc., are determined by differential scanning calorimetry (DSC) analysis from the first heating ramp by heating of the sample at 10° C./min from 0° C. to 300° C., unless otherwise indicated. For some cases, an exotherm, presumably from oxidation, may obscure the Tg during the first heating ramp. For these cases only, the Tg is determined in the second heating ramp. The melting, crystallization, and glass transition temperatures are measured as the midpoint of the respective endotherm or exotherm in the specified heating ramp.

For purposes herein, the polymer cis:trans ratio and the degree of polymerization were measured with a standard $^1$H NMR techniques according to methods known in the art. Samples were prepared with CDCl$_3$ (deuterated chloroform) in a 10 mm tube. The 41 NMR spectra were measured on a Bruker 500 MHz probe. Assignments were based on assignments from S. Hayano et al. (2014) *Macromolecules*, v. 47, pp. 7797-7811 and can be found in FIG. 1.

The following abbreviations may be used through this specification: AGE is allyl glycidyl ether, Bu is butyl, nBu is normal butyl, iBu is isobutyl, tBu is tertiary butyl, ptBu is para-tertiary butyl, CTA is chain-transfer agent, C$_6$$^=$ is 1-hexene, DSC is differential scanning calorimetry, Et is ethyl, GPC is gel permeation chromatography, Me is methyl, pMe is para-methyl, NBE is norbornene, NBES is substituted norbornene, PDI is polydispersity index (Mw/Mn) Ph is phenyl, Pr is propyl, iPr is isopropyl, n-Pr is normal propyl, ROMP is ring opening metathesis polymerization, RT is room temperature (i.e., approximately 23° C.), TCD is tetracyclododecene (CAS 21635-90-5), Tg is glass transition temperature, THF is tetrahydrofuran, and tol is toluene.

In embodiments according to the instant invention, a composition of matter comprises a functionalized oligomer obtained by ring opening metathesis polymerization (ROMP) of a sterically encumbered cyclic monomer with an olefinic chain transfer agent at a molar ratio of from 3:1 to about 40:1, wherein the functionalized oligomer has the formula:

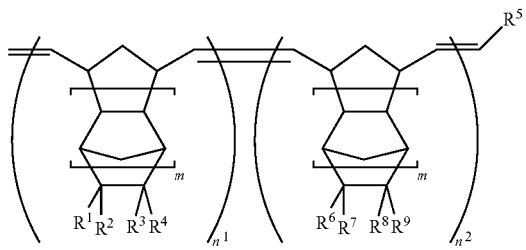

wherein n$^1$ is from 1 to about 40;
wherein n$^2$ is 0 (optional) or from 1 to about 5;
wherein a sum of n$^1$+n$^2$ is from 2 to about 40;
wherein m$^1$ and m$^2$ are independently 0 or an integer of 1 or more;
wherein R$^1$, R$^2$, R$^3$, and R$^4$ are independently hydrogen, a C$_1$-C$_{20}$ hydrocarbyl group, or a combination thereof, or two or more of R$^1$ to R$^4$ may independently join together to form a cyclic or polycyclic ring structure;

wherein $R^5$ is a $C_1$-$C_{40}$ hydrocarbyl group optionally comprising a functional group containing halogen or a Group 15 or 16 heteroatom or silicon or germanium or tin or lead;

wherein, when $n^2$ is 0, $R^5$ comprises the functional group;

wherein, when $n^2$ is nonzero, $R^6$, $R^7$, $R^8$, and $R^9$ are independently hydrogen; a functional group containing a halogen or a Group 15 or 16 heteroatom or silicon or germanium or tin or lead; a $C_1$-$C_{20}$ hydrocarbyl group optionally comprising the functional group; or a combination thereof; or two or more of $R^6$ to $R^9$ may independently join together to form a cyclic or polycyclic ring structure; provided at least one of $R^5$ to $R^9$ comprises the functional group.

In any embodiment, the sterically encumbered cyclic monomer is preferably selected from the group consisting of tricyclopentadiene, norbornene, dicyclopentadiene, dihydrodicyclopentadiene, dihydrotricyclopentadiene, tetracyclopentadiene, dihydrotetracyclopentadiene, and the like, including combinations thereof. As other examples of these sterically encumbered cyclic monomers, there can be mentioned tricyclo-[4.4.1$^{2,5}$0.0]undeca-3-ene; tetracyclo [6.5.1$^{2,5}$0.0$^{1,6}$0.0$^{8,13}$]trideca-3,8,10,12-tetraene (also known as "1,4-methano-1,4,4a,9a-tetrahydrofluorene") and tetracyclo-[6.6.1$^{2,5}$0.0$^{1,6}$0.0$^{8,13}$]tetradeca-3,8,10,12-tetraene (also known as "1,4-methano-1,4,4a, 5,10,10a-hexahydro-anthracene"); tetracyclododecenes (i.e., monomers forming oligomers of the formula (I) wherein m is 1) such as tetracyclododecene, 8-methyltetracyclododecene, 8-ethyltetracyclododecene, 8-cyclohexyltetracyclododecene, 8-cyclopentyltetracyclododecene, and 8-phenyltetracyclododecene; and hexacyclo-heptadecenes (i.e., monomers forming oligomers of Formula (I) wherein m is 2) such as hexacycloheptadecene, 12-methylhexacycloheptadecene, 12-ethylhexacycloheptadecene, 12-cyclohexylhexacycloheptadecene, 12-cyclopentylhexacycloheptadecene; and 12-phenylhexacycloheptadecene.

In any embodiment, the functional group can be selected from halogen, NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$, and the like, including combinations thereof, where R* is, independently, hydrogen or a $C_1$-$C_{20}$ hydrocarbyl.

In any embodiment, $R^5$ and/or one or more of $R^6$, $R^7$, $R^8$, and $R^9$ can be hydrocarbyl groups wherein heteroatoms have been inserted within the hydrocarbyl groups as halogen, O, S, Se, Te, NR*, PR*, AsR*, SbR*, BR*, SiR*$_2$, GeR*$_2$, SnR*$_2$, PbR*$_2$, or the like, including combinations thereof, where R* is, independently, hydrogen or a $C_1$-$C_{20}$ hydrocarbyl.

As specific examples of suitable functionalized norbornene monomers, there can be mentioned tetracyclododecenes having a double bond outside the ring, such as 8-methylidene-tetracyclododecene, 8-ethylidenetetracyclododecene, 8-vinyltetracyclododecene, 8-propenyltetracyclododecene, 8-cyclohexenyltetracyclododecene and 8-cyclopentenyl-tetracyclododecene; tetracyclododecenes having a substituent containing an oxygen atom, such as 8-methoxycarbonyltetracyclododecene, 8-methyl-8-methoxycarbonyltetracyclododecene, 8-hydroxymethyl-tetracyclododecene, 8-carboxytetracyclododecene, tetracyclododecene-8,9-dicarboxylic acid and tetracyclododecene-8,9-dicarboxylic anhydride; tetracyclododecenes having a substituent containing a nitrogen atom, such as 8-cyanotetracyclododecene and tetracyclododecene-8,9-dicarboxylic acid imide; tetracyclododecenes having a substituent containing a halogen atom, such as 8-chlorotetracyclododecene; tetracyclododecenes having a substituent containing a silicon atom, such as 8-trimethoxysilyltetracyclododecene; hexacycloheptadecenes having a double bond outside the ring, such as 12-methylidenehexacycloheptadecene, 12-ethylidene-hexacycloheptadecene, 12-vinylhexacycloheptadecene, 12-propenylhexacycloheptadecene, 12-cyclohexenyl-hexacycloheptadecene and 12-cyclopentenyl-hexacycloheptadecene; hexacycloheptadecenes having a substituent containing an oxygen atom, such as 12-methoxycarbonylhexacycloheptadecene, 12-methyl-12-methoxycarbonyl-hexacycloheptadecene, 12-hydroxymethylhexacycloheptadecene, 12-carboxyhexacycloheptadecene, hexacycloheptadecene-12,13-dic arboxylic acid and hexacycloheptadecene-12,13-dicarboxylic anhydride; hexacycloheptadecenes having a substituent containing a nitrogen atom, such as 12-cyanohexacyclo-heptadecene and hexacycloheptadecene-12,13-dicarboxylic acid imide; hexacycloheptadecenes having a substituent containing a halogen atom, such as 12-chlorohexacycloheptadecene; and hexacycloheptadecenes having a substituent containing a silicon atom, such as 12-trimethoxysilylhexacycloheptadecene.

Among the above-recited monomers, monomers having straight chain or branched chain substituents are more preferable in some embodiments because they tend to form amorphous oligomers. The monomers can include endo and/or exo isomers, preferably a mixture of endo and exo isomers to facilitate the formation of amorphous oligomers. More specifically, the isomer mixture preferably comprises from greater than 30% and up to less than 70% by mole, of each of the two isomers.

In any embodiment, the olefinic chain transfer agent preferably comprises a substituted or unsubstituted $C_3$-$C_{40}$ alpha-olefin or cis-olefin, more preferably a $C_4$-$C_{20}$ alpha-olefin, and even more preferably 1-hexene. As functionalized olefins there can be mentioned olefins of the formula $CH_2=CHR^7$, where $R^7$ is a $C_1$-$C_{38}$ hydrocarbyl group optionally comprising a functional group containing a Group 15 or 16 heteroatom or silicon, or a combination thereof, preferably a $C_2$-$C_{18}$ hydrocarbyl group optionally comprising the functional group. As specific examples of functionalize alpha olefins there may be mentioned, allyl glycidyl ether, 3-butenyl-oxirane, 3-butenyl-triethoxysilane, N-allyl-N,N-bis(trimethylsilyl)amine, and the like.

Preferably, the sterically encumbered cyclic monomer comprises 5-(triethoxysilyl)-2-norbornene. More preferably, the chain transfer agent comprises allyl glycidyl ether, 3-butenyl-oxirane, 3-butenyl-triethoxysilane, N-allyl-N,N-bis(trimethylsilyl)amine, or the like, including combinations thereof, and the sterically encumbered cyclic monomer comprises 5-(triethoxysilyl)-2-norbornene.

In any embodiment, the functionalized oligomer can have an Mn determined by gel permeation chromatography calibrated to polystyrene of about 8,000 g/mole or less, preferably from about 1,000 g/mole to about 5,000 g/mole. Preferably, the functionalized oligomer has an Mn determined by 41 NMR of about 5,000 or less, preferably from about 400 to about 4,000 g/mole.

In any embodiment, the functionalized oligomer has Tg determined by differential scanning calorimetry from a first heating scan greater than about 25° C., or from a second heating scan if the first heating scan Tg is obscured by an exotherm, preferably from about 40° C. to about 180° C.

Preferably, the sum of $n^1$+$n^2$ is from 3 to about 20, and/or $m^1$ and $m^2$ are independently 0 or 1. $R^1$, $R^2$, $R^3$, and $R^4$ can be hydrogen in any embodiment. $R^5$ can be a $C_3$-$C_{20}$ alkyl group.

In any embodiment, the sterically encumbered cyclic monomer can be selected from the group consisting of tricyclopentadiene, norbornene, dicyclopentadiene, dihydrodicyclopentadiene, dihydrotricyclopentadiene, tetracyclopentadiene, dihydrotetracyclopentadiene, and the like, including combinations thereof.

In any embodiment, the sterically encumbered cyclic monomer is preferably selected from the group consisting of tricyclopentadiene, norbornene, dicyclopentadiene, dihydrodicyclopentadiene, dihydrotricyclopentadiene, tetracyclopentadiene, dihydrotetracyclopentadiene, and the like, including combinations thereof. As other examples of these sterically encumbered cyclic monomers, there can be mentioned tricyclo-[4.4.1$^{2.5}$0.0]undeca-3-ene; tetracyclo [6.5.1$^{2.5}$0.0$^{1.6}$0.0$^{8.13}$]trideca-3,8,10,12-tetraene (also known as "1,4-methano-1,4,4a,9a-tetrahydrofluorene") and tetracyclo-[6.6.1$^{2.5}$0.0$^{1.6}$0.0$^{8.13}$]tetradeca-3,8,10,12-tetraene (also known as "1,4-methano-1,4,4a, 5,10,10a-hexahydro-anthracene"); tetracyclododecenes (i.e., monomers forming oligomers of the formula (I) wherein m is 1) such as tetracyclododecene, 8-methyltetracyclododecene, 8-ethyltetracyclododecene, 8-cyclohexyltetracyclododecene, 8-cyclopentyltetracyclododecene, and 8-phenyltetracyclododecene; and hexacyclo-heptadecenes (i.e., monomers forming oligomers of Formula (I) wherein m is 2) such as hexacycloheptadecene, 12-methylhexacycloheptadecene, 12-ethylhexacycloheptadecene, 12-cyclohexylhexacycloheptadecene, 12-cyclopentylhexacycloheptadecene; and 12-phenylhexacycloheptadecene.

As specific examples of the functionalized norbornene monomers, there can be mentioned tetracyclododecenes having a double bond outside the ring, such as 8-methylidene-tetracyclododecene, 8-ethylidenetetracyclododecene, 8-vinyltetracyclododecene, 8-propenyltetracyclododecene, 8-cyclohexenyltetracyclododecene and 8-cyclopentenyl-tetracyclododecene; tetracyclododecenes having a substituent containing an oxygen atom, such as 8-methoxycarbonyltetracyclododecene, 8-methyl-8-methoxycarbonyltetracyclododecene, 8-hydroxymethyl-tetracyclododecene, 8-carboxytetracyclododecene, tetrac yclododecene-8,9-dicarboxylic acid and tetracyclododecene-8,9-dicarboxylic anhydride; tetracyclododecenes having a substituent containing a nitrogen atom, such as 8-cyanotetracyclododecene and tetracyclododecene-8,9-dicarboxylic acid imide; tetracyclododecenes having a substituent containing a halogen atom, such as 8-chlorotetracyclododecene; tetracyclododecenes having a substituent containing a silicon atom, such as 8-trimethoxysilyltetracyclododecene; hexacycloheptadecenes having a double bond outside the ring, such as 12-methylidenehexacycloheptadecene, 12-ethylidene-hexacycloheptadecene, 12-vinylhexacycloheptadecene, 12-propenylhexacycloheptadecene, 12-cyclohexenyl-hexacycloheptadecene and 12-cyclopentenyl-hexacycloheptadecene; hexacycloheptadecenes having a substituent containing an oxygen atom, such as 12-methoxycarbonylhexacycloheptadecene, 12-methyl-12-methoxycarbonyl-hexacycloheptadecene, 12-hydroxymethylhexacycloheptadecene, 12-carboxyhexacycloheptadecene, hexacycloheptadecene-12,13-dic arboxylic acid and hexacycloheptadecene-12,13-dicarboxylic anhydride; hexacycloheptadecenes having a substituent containing a nitrogen atom, such as 12-cyanohexacyclo-heptadecene and hexacycloheptadecene-12,13-dicarboxylic acid imide; hexacycloheptadecenes having a substituent containing a halogen atom, such as 12-chlorohexacycloheptadecene; and hexacycloheptadecenes having a substituent containing a silicon atom, such as 12-trimethoxysilylhexacycloheptadecene.

Among the above-recited monomers, monomers having straight chain or branched chain substituents are more preferable in some embodiments because they tend to form amorphous oligomers. The monomers can include endo and/or exo isomers, preferably a mixture of endo and exo isomers to facilitate the formation of amorphous oligomers. More specifically, the isomer mixture comprises from greater than 30 up to less than 70% by mole, of each of the two isomers.

In any embodiment, the olefinic chain transfer agent comprises a substituted or unsubstituted $C_3$-$C_{40}$ alpha-olefin or cis-olefin, preferably a $C_4$-$C_{20}$ alpha-olefin, more preferably 1-hexene.

In further embodiments according to the present invention, a process for preparing a functionalized oligomer comprises: contacting a sterically encumbered cyclic monomer with a ring opening metathesis polymerization (ROMP) catalyst in the presence of an olefinic chain transfer agent at a molar ratio of sterically encumbered cyclic monomer to olefinic chain transfer agent from 2:1 to about 40:1 at conditions to form the oligomer, wherein the sterically encumbered cyclic monomer comprises a functionalized comonomer and/or wherein the olefinic chain transfer agent is functionalized; and recovering the functionalized oligomer.

In any embodiment of the process, the functional group is selected from halogen, NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$, and the like, including combinations thereof, where R* is, independently, hydrogen or a $C_1$-$C_{20}$ hydrocarbyl.

In any embodiment of the process, the functional group can comprise a hydrocarbyl group wherein a heteroatom has been inserted within the hydrocarbyl group as halogen, O, S, Se, Te, NR*, PR*, AsR*, SbR*, BR*, SiR*$_2$, GeR*$_2$, SnR*$_2$, PbR*$_2$, or the like, including combinations thereof, where R* is, independently, hydrogen or a $C_1$-$C_{20}$ hydrocarbyl. In a preferred embodiment, the functional group is a silane, such as an alkyl, alkoxy silane, and/or alkyl/alkoxy silane comprising a $C_1$-$C_{10}$ or $C_{20}$ hydrocarbyl, and/or a glycidyl ether such as a $C_4$-$C_{10}$ or $C_{20}$ glycidyl ether.

In any embodiment of the process, the olefinic chain transfer agent comprises allyl glycidyl ether, allyl silane such as an allyl Si(OEt)$_3$, allyl-CH$_2$—CH(O)CH$_2$, allyl-CH$_2$—N—(SiMe$_3$)$_2$, or the like, or a combination thereof. In any embodiment of the process, the functionalized comonomer comprises 5-(triethoxysilyl)-2-norbornene. Preferably, the olefinic chain transfer agent comprises allyl glycidyl ether, allyl Si(OEt)$_3$, allyl-CH$_2$—CH(O)CH$_2$, allyl-CH$_2$-N—(SiMe$_3$)$_2$, or a combination thereof, and the functionalized comonomer comprises 5-(triethoxysilyl)-2-norbornene.

In any embodiment of the process, the functionalized oligomer has an Mn determined by gel permeation chromatography calibrated to polystyrene of about 8,000 g/mole or less, preferably from about 1,000 g/mole to about 5,000 g/mole. Preferably, the functionalized oligomer has an Mn determined by 41 NMR of about 5,000 or less, more preferably from about 400 to about 4,000 g/mole.

In any embodiment of the process, the functionalized oligomer can have Tg determined by differential scanning calorimetry from a first heating scan, or from a second heating scan if the first heating scan Tg is obscured by an exotherm, greater than about 25° C., preferably from about 40° C. to about 180° C.

In any embodiment of the process, the functionalized oligomer can have the formula:

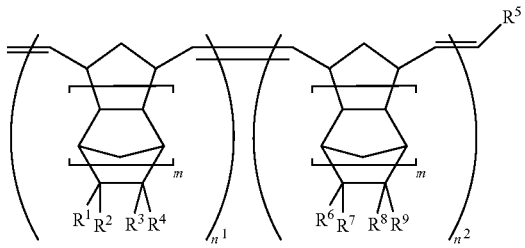

wherein $n^1$ is from 1 to about 40;
wherein $n^2$ is 0 (optional) or from 1 to about 5;
wherein a sum of $n^1+n^2$ is from 2 to about 40;
wherein $m^1$ and $m^2$ are independently 0 or an integer of 1 or more;
wherein $R^1$, $R^2$, $R^3$, and $R^4$ are independently hydrogen, a $C_1$-$C_{20}$ hydrocarbyl group, or a combination thereof, or two or more of $R^1$ to $R^4$ may independently join together to form a cyclic or polycyclic ring structure;
wherein $R^5$ is a $C_1$-$C_{40}$ hydrocarbyl group optionally comprising a functional group containing halogen or a Group 15 or 16 heteroatom or silicon or germanium or tin or lead;
wherein, when $n^2$ is 0, $R^5$ comprises the functional group;
wherein, when $n^2$ is nonzero, $R^6$, $R^7$, $R^8$, and $R^9$ are independently hydrogen; a functional group containing a halogen or a Group 15 or 16 heteroatom or silicon or germanium or tin or lead; a $C_1$-$C_{20}$ hydrocarbyl group optionally comprising the functional group; or a combination thereof; or two or more of $R^6$ to $R^9$ may independently join together to form a cyclic or polycyclic ring structure; provided at least one of $R^5$ to $R^9$ comprises the functional group.

In any embodiment of the process, the sum of $n^1+n^2$ is from 3 to about 20; and/or $m^1$ and $m^2$ are independently 0 or 1; and/or $R^1$, $R^2$, $R^3$, and $R^4$ are hydrogen; and/or $R^5$ is a $C_3$-$C_{20}$ alkyl group.

In any embodiment of the process, the sterically encumbered cyclic monomer can be selected from the group consisting of tricyclopentadiene, norbornene, dicyclopentadiene, dihydrodicyclopentadiene, dihydrotricyclopentadiene, tetracyclopentadiene, dihydrotetracyclopentadiene, and the like, including combinations thereof.

In any embodiment of the process, the olefinic chain transfer agent can comprise a substituted or unsubstituted $C_3$-$C_{40}$ alpha-olefin or cis-olefin, preferably a $C_4$-$C_{20}$ alpha-olefin, more preferably 1-hexene.

In any embodiment of the process, the ROMP catalyst can be a ruthenium benzylidene catalyst, preferably a Grubbs $3^{rd}$ catalyst, or the ROMP catalyst can comprise a system of transition metal halide, organometallic compound, and an alcohol or amine compound.

In any embodiment of the process, the conditions can comprise a solvent and a temperature from −30° C. to 200° C., preferably 0° C. to 180° C.

As specific examples of the solvent, there can be mentioned aliphatic hydrocarbons such as pentane, hexane and heptane; alicyclic hydrocarbons such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene, and cyclooctane; aromatic hydrocarbons such as benzene, toluene, xylene, ethylbenzene, and diethylbenzene; halogen-containing aliphatic hydrocarbons such as dichloromethane, chloroform, and 1,2-dichloroethane; halogen-containing aromatic hydrocarbons such as chlorobenzene and dichlorobenzene; nitrogen-containing hydrocarbons such as nitromethane, nitrobenzene, and acetonitrile; and ethers such as diethyl ether and tetrahydrofuran.

Examples

The present disclosure can be further illustrated by the following non-limiting examples. In the following examples, TCD was obtained from Tyger Scientific and purified by the steps of filtration through a column of alumina, degassing via the freeze-pump-thaw method, and stored over activated molecular sieves; 1-hexene was obtained from Sigma-Aldrich, degassed via the freeze-pump-thaw method, and stored over activated molecular sieves; Grubbs 2G catalyst was obtained from Sigma-Aldrich and used as received; Grubbs 3G catalyst was obtained from Sigma-Aldrich and used as received; Schrock Mo catalyst was obtained from Strem Chemicals and used as received; allyl glycidyl ether (AGE) was obtained from Sigma-Aldrich and used as received; ethyl allyl ether was obtained from Sigma-Aldrich and used as received; 5-(triethyoxylsilyl)-2-norbornene was obtained from Tyger Scientific and used as received.

Scheme 1

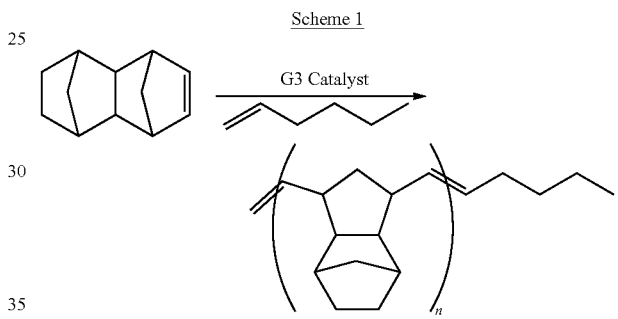

Example 1: ROMP reaction of TCD with 1-hexene as chain transfer agent (CTA) per Scheme 1. Run 1-1 was a representative experiment with 5:1 TCD:CTA, under a nitrogen atmosphere a solution of purified TCD (2.26 g, 2.22 mL (d=1.02), 14.1 mmol) in toluene (10 mL) was added to a 20 mL glass scintillation vial equipped with a magnetic stirrer. Anhydrous 1-hexene (0.24 g, 0.35 mL, 2.8 mmol) was added to the reaction flask. While the flask was stirring, Grubbs-3G Catalyst (25 mg; 0.028 mmol) was dissolved in anhydrous toluene (4 mL) and added to the mixture of TCD and 1-hexene. The vial was capped and a bleed needle was inserted. The reaction was stirred at room temperature under a nitrogen atmosphere for 3 hours. The Grubbs-3G catalyst was quenched via the addition of ethyl allyl ether (0.024 g, 0.03 mL, 0.28 mmol) in toluene (1 mL) to the reaction and allowing the reaction to stir for 30 minutes. An aliquot of the reaction mixture after 3 hours was analyzed via $^1$H NMR (CDCl$_3$) and, as seen in FIG. 1, complete conversion of TCD was confirmed. The product was isolated and dried in a rotary evaporator (1.21 g).

The $^1$H NMR analysis shown in FIG. 1 was primarily focused upon terminal vinyl signals (5.9 ppm; 5.4 ppm, 5.0 ppm), main chain alkene (5.5 ppm), and aliphatic signals from ring opened TCD (2.95 ppm, 2.68 ppm). See FIG. 1 for peak assignment. The number of monomer repeats can be estimated from the combined terminal olefin (5H) signals, with either the main chain alkene (2H per monomer unit) or the combined aliphatic (2H per monomer unit). Both calculations estimate the number of monomer units to be roughly 6.15. As the molecular weight of TCD is 160 g/mol and the molecular weight of 1-hexene is 84 g/mol, this number of monomer units corresponds to an estimated Mn of 1070 g/mol. GPC results (calibrated to polystyrene) gave Mn of 1736 g/mol, Mw=2465 g/mol, and Mw/Mn=1.42.

Runs 1-2 through 1-8 were conducted as in Run 1-1 except that the amount of chain transfer agent (1-hexene) added was varied to demonstrate molecular weight control over the resulting oligomers. All other variables, e.g., catalyst loading, TCD loading, TCD concentration, reaction time, etc., were kept constant. The results are tabulated in Table 1. From these results, it was seen that the molecular weight and Tg both generally increased as the amount of 1-hexene added decreased.

TABLE 1

TCD/1-Hexene ROMP with Grubbs G3 Catalyst

| Run | TCD:$C_6^{-a}$ | Theo. $Mn^b$ | $^1$H NMR calc. ratio$^c$ | Implied $Mn^d$ | GPC Mn | GPC Mw | GPC PDI | Tg (° C.)$^e$ | Cis/Trans (% cis) |
|---|---|---|---|---|---|---|---|---|---|
| 1-1 | 5:1 | 884 | 6.15 | 1070 | 1736 | 2465 | 1.42 | 49 | 53 |
| 1-2 | 10:1 | 1684 | 10.43 | 1753 | 1855 | 3092 | 1.67 | 59 | 58 |
| 1-3 | 12:1 | 2004 | 11.10 | 1860 | 2847 | 4700 | 1.65 | 85 | 57 |
| 1-4 | 14:1 | 2324 | 13.72 | 2279 | 2981 | 4986 | 1.67 | 70 | 58 |
| 1-5 | 16:1 | 2644 | 14.86 | 2462 | 3217 | 5491 | 1.71 | 72 | 59 |
| 1-6 | 18:1 | 2694 | 15.20 | 2516 | 3086 | 5461 | 1.77 | 111$^f$ | 58 |
| 1-7 | 20:1 | 3284 | 19.81 | 3254 | 4445 | 7450 | 1.68 | 136$^f$ | 59 |
| 1-8 | 40:1 | 6484 | 25.63 | 4184 | 6256 | 11847 | 1.89 | 160$^f$ | 62 |

Notes for Table 1: $^a$ polymerization ratio of TCD and 1-hexene; $^b$theoretical Mn based on polymerization ratio of TCD:1-hexene; $^c$ratio of TCD and 1-hexene calculated from $^1$H NMR; $^d$Mn implied by $^1$H NMR ratio; $^e$ Tg determined by DSC, first heating ramp unless noted; $^f$ exotherm obscured Tg on first heating ramp, Tg from second heating ramp reported.

Example 2: ROMP reaction of TCD with 1-hexene using different catalysts. This series of experiments was performed as above, demonstrates the impact of catalyst selection on the resulting resin, and also shows that the molecular weight control, by varying the amount of chain transfer agent (1-hexene) added, was effective for each catalyst. All other variables, e.g., catalyst loading, TCD loading, TCD concentration, reaction time, etc., were kept constant. The results are tabulated in Table 2. These results demonstrate the applicability of this chemistry with different ROMP catalysts. Grubbs-3G catalyst demonstrates the best molecular weight control with varying 1-hexene additions, although the chemistry can be carried out successfully with other ROMP catalysts as well.

TABLE 2

TCD/1-Hexene ROMP with Different Catalysts

| Run | Catalyst | TCD:$C_6^{-a}$ | Implied $Mn^b$ | GPC Mn | GPC Mw | Tg (° C.)$^c$ | Cis/Trans (% cis) |
|---|---|---|---|---|---|---|---|
| 2-1 | Grubbs-2G | 5:1 | 871 | 857 | 1217 | 54 | 42 |
| 2-2 | Grubbs-2G | 10:1 | 1225 | 557 | 820 | 80 | 62 |
| 2-3 | Grubbs-2G | 20:1 | 1819 | 643 | 1033 | 54 | 60 |
| 2-4 | Grubbs-2G | 40:1 | 1904 | 774 | 1240 | 147$^d$ | 66 |
| 1-1 | Grubbs-3G | 5:1 | 1070 | 1736 | 2465 | 49 | 53 |
| 1-2 | Grubbs-3G | 10:1 | 1753 | 1855 | 3092 | 59 | 58 |
| 1-7 | Grubbs-3G | 20:1 | 3254 | 4445 | 7450 | 136$^d$ | 59 |
| 1-8 | Grubbs-3G | 40:1 | 4184 | 6256 | 11847 | 160$^d$ | 62 |
| 2-5 | Schrock Mo | 5:1 | 1127 | 3052 | 8494 | 44 | 59 |
| 2-6 | Schrock Mo | 10:1 | 1896 | 3945 | 12966 | 54 | 64 |
| 2-7 | Schrock Mo | 20:1 | 2937 | 6326 | 19090 | 84 | 66 |
| 2-8 | Schrock Mo | 40:1 | 3106 | 7365 | 24447 | ND | 70 |

Notes for Table 2: $^a$ polymerization ratio of TCD and 1-hexene; $^b$ratio of TCD and 1-hexene calculated from $^1$H NMR; $^c$ Tg determined by DSC, first heating ramp unless noted; $^d$ exotherm obscured Tg on first heating ramp, Tg from second heating ramp reported; ND—not detected.

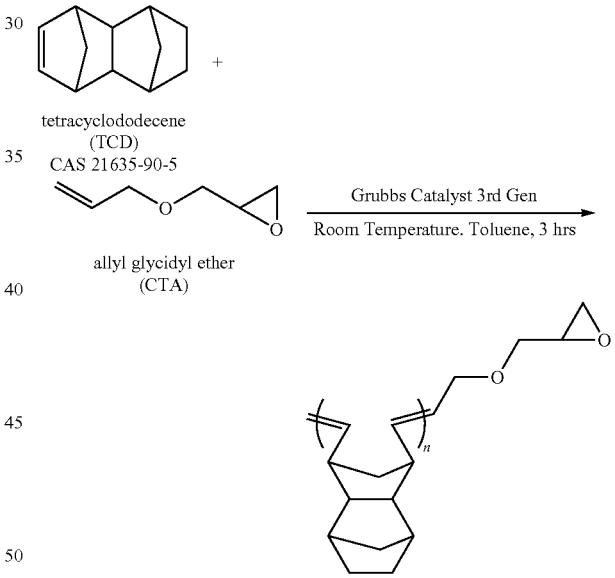

Scheme 2 tetracyclododecene (TCD) CAS 21635-90-5 allyl glycidyl ether (CTA)

Grubbs Catalyst 3rd Gen
Room Temperature. Toluene, 3 hrs

Example 3: ROMP reaction of TCD with functionalized CTA according to reaction Scheme 2. In Run 3-1, in a nitrogen glove box, a solution of purified TCD (2.26 g, 2.22 mL (d=1.02), 14.1 mmol) in toluene (10 mL) was added to a 20 mL glass scintillation vial equipped with a magnetic stirrer. AGE (0.161 g, 0.167 mL, 1.41 mmol) was added to the reaction flask. While stirring the vial, Grubbs-3G Catalyst (25 mg; 0.028 mmol) dissolved in anhydrous toluene (4 mL) was added. The vial was capped and a bleed needle was inserted. The reaction was stirred at room temperature in the glove box for 3 hours. After 3 hours, the Grubbs-3G catalyst was quenched by adding ethyl allyl ether (0.24 g, 0.03 mL, 0.28 mmol) in toluene (1 mL) to the reaction and allowing the reaction to stir for 30 minutes. The product (2.101 g) was isolated and dried with a rotary evaporator.

Figure 2:
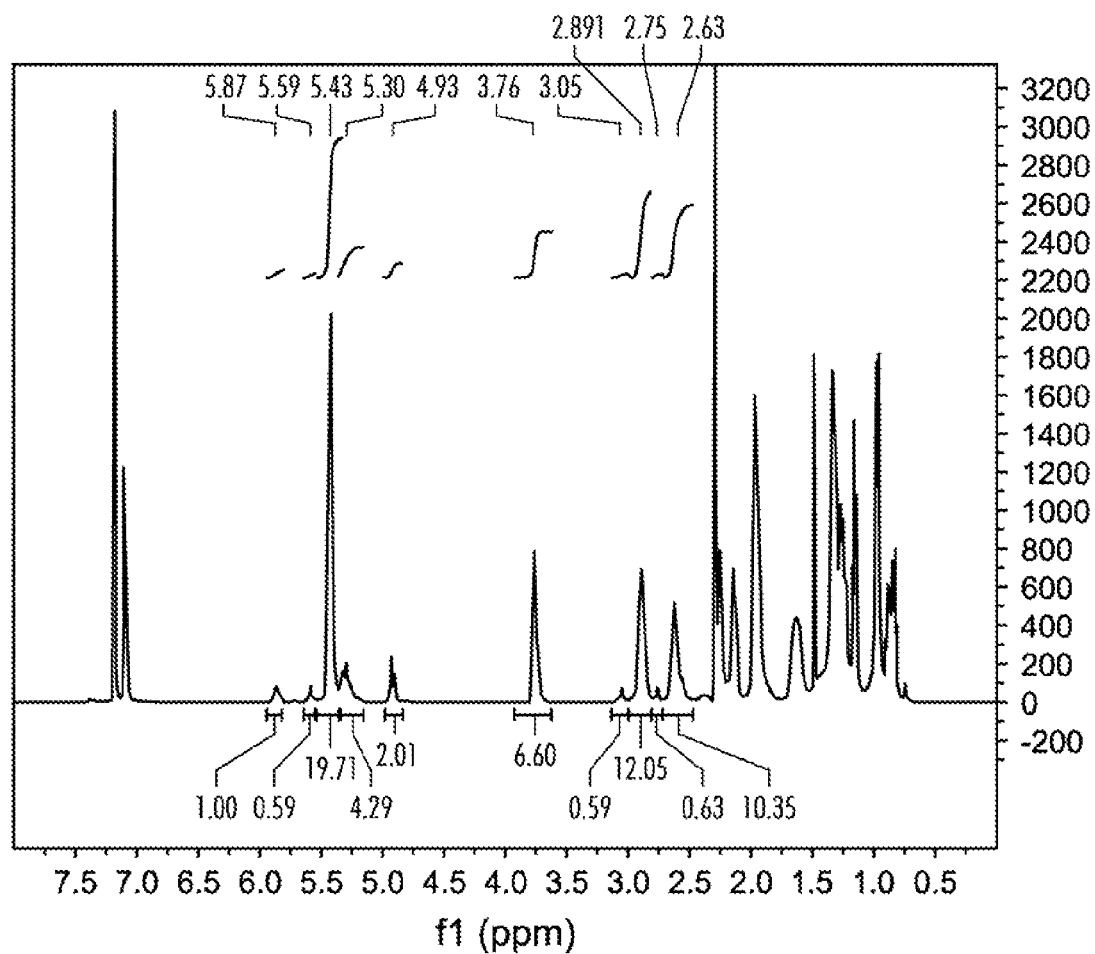
FIG. 2 is a $^1$H NMR analysis of the resulting resin from Run 4-1 according to an example of the present invention.

¹H NMR (CDCl₃) of the product was taken, and the results are presented in FIG. 2. ¹H NMR analysis was primarily focused upon terminal vinyl signals (5.8-5.9 ppm; 5.4 ppm, 5.0 ppm), main chain alkene (5.5 ppm), and aliphatic signals from ring opened TCD (2.95 ppm, 2.73 ppm). The number of monomer repeats was estimated from the combined terminal olefin (5H) signals, with either the main chain alkene (2H per monomer unit) or the combined aliphatic (2H per monomer unit). Both calculations estimate the number of monomer units to be roughly 10.38. This number of monomer units corresponds to an estimated Mn of 1,746 g/mol. GPC results (calibrated to polystyrene) gave Mn of 1,825 g/mol, Mw=3,069 g/mol, and Mw/Mn=1.68.

Run 3-1 demonstrates that functionality can be incorporated via the use of functionalized chain-transfer agents. To highlight the versatility of this approach, we have carried out experiments with a number of different functionalized chain-transfer agents. The results are tabulated in Table 3.

TABLE 3

TCD/Functionalized CTA ROMP with Different CTA's

| Run | Chain Transfer Agent, ⟵⟵X | Polymerization TCD:CTA (g-moles) | Mn (per ¹H NMR) |
|---|---|---|---|
| 3-2 | ⟵⟵⟵Si(OEt)₃ | 12:1 | 2875 |
| 3-3 | ⟵⟵⟵⟵△O | 12:1 | 2386 |
| 3-4 | ⟵⟵⟵O△O | 12:1 | 3300 |
| 3-5 | ⟵⟵⟵N(SiMe₃)(SiMe₃) | 12:1 | 2873 |

As can be seen, these chain-transfer agents demonstrated molecular weight control over the resulting resin. Other functionalized chain-transfer agents are contemplated as being similarly incorporated with molecular weight control.

Scheme 3

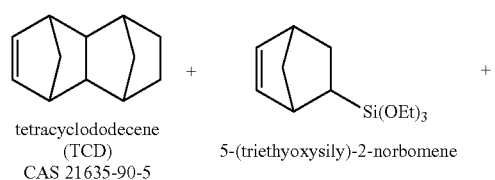

tetracyclododecene (TCD) CAS 21635-90-5 + 5-(triethyoxysily)-2-norbornene Si(OEt)₃ +

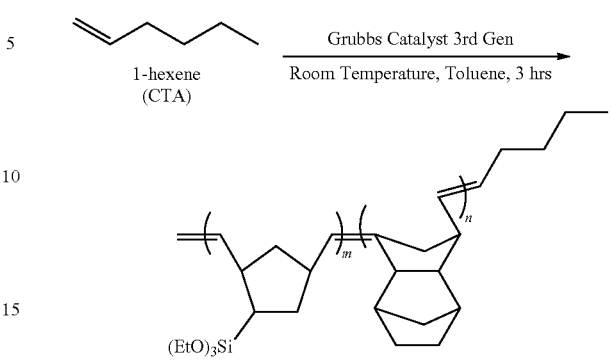

1-hexene (CTA) — Grubbs Catalyst 3rd Gen, Room Temperature, Toluene, 3 hrs

Example 4: Oligo(TCD) with functionalized comonomer (NBES) per reaction Scheme 3. In Run 4-1, in a nitrogen glove box, a solution of purified TCD (2.036 g, 2.00 mL. 12.7 mmol) in toluene (10 mL) was added to a 20 mL glass scintillation vial equipped with a magnetic stirrer. 5-(Triethyoxylsilyl)-2-norbornene (0.362 g, 0.37 mL, 1.4 mmol) as the NBES and anhydrous 1-hexene (0.12 g, 0.17 mL, 1.4 mmol) as the CTA were added to the reaction flask. While stirring the vial, Grubbs-3G Catalyst (25 mg; 0.028 mmol) dissolved in anhydrous toluene (4 mL) was added. The vial was capped and a bleed needle was inserted. The reaction was stirred at room temperature in glove box for 3 hours. After 3 hours, the Grubbs-3G catalyst was quenched by adding ethyl allyl ether (0.24 g, 0.03 mL, 0.28 mmol) in toluene (1 mL) to the reaction and allowing the reaction to stir for 30 minutes. The product (0.939 g) was isolated and dried with a rotary evaporator. ¹H NMR (CDCl₃) of the product was taken, and the results are shown in FIG. 2.

41 NMR analysis was primarily focused upon terminal vinyl signals (5.9 ppm; 4.9 ppm), main chain alkene (5.0-5.7 ppm), aliphatic signals from ring opened TCD (2.9 ppm, 2.7 ppm) and substituted norbornene (3.1 ppm, 2.8 ppm), and triethoxysilyl (3.8 ppm). The number of monomer repeats was estimated from the combined terminal olefin (3H) signals, with either the main chain alkene (2H per monomer unit, corrected for overlapping vinyl signal) or the combined aliphatic (2H per monomer unit). Both calculations estimated the number of monomer units to be roughly 12.01 (based on calculation with aliphatic signal). The percent of functionalized monomers incorporated into the resin was based on the triethoxysilyl signal and the sum of the aliphatic signals from ring opened monomers. Based upon this calculation, roughly 9.1% of the monomers were functionalized. The number of monomer units and the degree of incorporation of functionalized monomers corresponded to an estimated Mn of 2,082 g/mol. GPC results (calibrated to polystyrene) give Mn of 2,663 g/mol, Mw=4,298 g/mol, and Mw/Mn=1.61.

Run 4-1 demonstrated that functionality can be incorporated via the use of functionalized monomers. To highlight the versatility of this approach, we carried out an additional experiment (Run 4-2) with a different ratio of functionalized monomer. The results are tabulated in Table 4.

TABLE 4

| | | | | | | | | Theo. | |
|---|---|---|---|---|---|---|---|---|---|
| | TCD: NBES: | Theo. | $^1$H NMR | Implied | GPC | GPC | GPC | NBES | NBES |
| Run | $C_6$= [a] | Mn [b] | calc. ratio [c] | Mn [d] | Mn | Mw | PDI | (Mol %) [e] | (Mol %) [f] |

Oligo(TCD) with NBES.

| Run | TCD:NBES:$C_6$= [a] | Theo. Mn [b] | $^1$H NMR calc. ratio [c] | Implied Mn [d] | GPC Mn | GPC Mw | GPC PDI | Theo. NBES (Mol %) [e] | NBES (Mol %) [f] |
|---|---|---|---|---|---|---|---|---|---|
| 4-1 | 9:1:1 | 1752 | 12.0 | 2082 | 2663 | 4298 | 1.61 | 10 | 9.1 |
| 4-2 | 8:2:1 | 1848 | 13.6 | 2503 | 2836 | 4559 | 1.61 | 20 | 20.9 |

Notes for Table 4: [a] molar polymerization ratio of TCD, NBES = 5-(triethyoxylsilyl)-2-norbornene, and 1-hexene; [b] theoretical Mn based on polymerization ratio of TCD:NBES: 1-hexene; [c] ratio of TCD and NBES calculated from $^1$H NMR; [d] Mn implied by $^1$H NMR ratio; [e] theoretical NBES content based on polymerization ratio; [f] NBES content by $^1$H NMR.

As can be seen, there was still control over the molecular weight despite the addition of a functionalized monomer. Furthermore, the functionalized monomer was incorporated at the targeted ratio for both experiments.

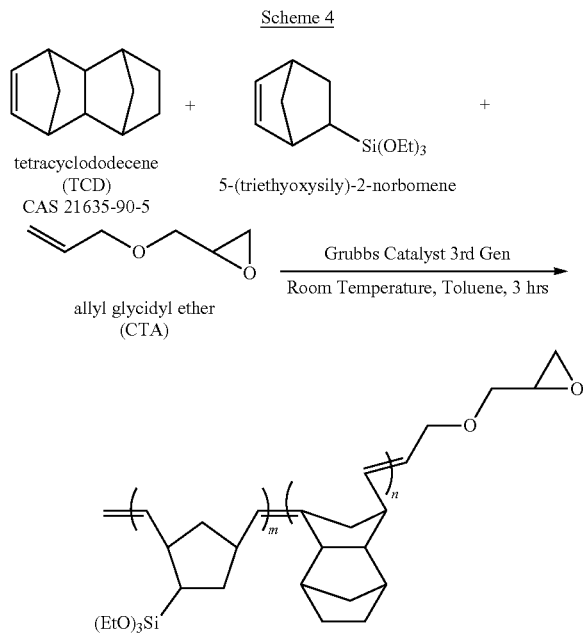

Scheme 4

Example 5: Mixed Functionalization NBES/AGE in accordance with reaction Scheme 4. In Run 5-1, in a nitrogen glove box, a solution of purified TCD (2.036 g, 2.00 mL. 12.7 mmol) in toluene (10 mL) was added to a 20 mL glass scintillation vial equipped with a magnetic stirrer. 5-(Triethyoxylsilyl)-2-norbornene (0.362 g, 0.37 mL, 1.4 mmol) as the NBES and AGE (0.161 g, 0.17 mL, 1.4 mmol) as the functionalized CTA were added to the reaction flask.

While stirring the vial, Grubbs-3G Catalyst (25 mg; 0.028 mmol) dissolved in anhydrous toluene (4 mL) was added. The vial was capped and a bleed needle was inserted. The reaction was stirred at room temperature in glove box for 3 hours. After 3 hours, the Grubbs-3G catalyst was quenched by adding ethyl allyl ether (0.24 g, 0.03 mL, 0.28 mmol) in toluene (1 mL) to the reaction and allowing the reaction to stir for 30 minutes. The product was isolated and dried (2.080 g) with a rotary evaporator. $^1$H NMR (CDCl$_3$) of the product was obtained.

$^1$H NMR analysis was primarily focused upon terminal vinyl signals (5.8-5.9 ppm; 4.9 ppm), main chain alkene (5.0-5.7 ppm), aliphatic signals from ring opened TCD (2.9 ppm, 2.7 ppm) and substituted norbornene (3.1 ppm, 2.8 ppm), and triethoxysilyl (3.8 ppm). The number of monomer repeats was estimated from the combined terminal olefin (3H) signals, with either the main chain alkene (2H per monomer unit, corrected for overlapping vinyl signal) or the combined aliphatic (2H per monomer unit). Both calculations estimated the number of monomer units to be roughly 9.57 (based on calculation with aliphatic signal). The percent of functionalized monomers incorporated into the resin was based on the triethoxysilyl signal and the sum of the aliphatic signals from ring opened monomers. Based upon this calculation, roughly 12.2% of the monomers were functionalized. The number of monomer units and the degree of incorporation of functionalized monomers corresponded to an estimated Mn of 1,729 g/mol. GPC results (calibrated to polystyrene) gave Mn of 2,426 g/mol, Mw=3,805 g/mol, and Mw/Mn=1.57.

Run 5-1 demonstrated that multiple functional groups can be incorporated at the same time via the use of functionalized monomers and functionalized chain-transfer agents. To highlight the versatility of this approach, we carried out an additional experiment (Run 5-2) with a different proportion of functionalized comonomer. The results are tabulated in Table 5.

TABLE 5

Oligo(TCD) with NBES and AGE.

| Run | TCD:NBES:AGE [a] | Theo. Mn [b] | $^1$H NMR calc. ratio [c] | Implied Mn [d] | GPC Mn | GPC Mw | GPC PDI | Theo. NBES (Mol %) [e] | NBES (Mol %) [f] |
|---|---|---|---|---|---|---|---|---|---|
| 5-1 | 9:1:1 | 1782 | 9.57 | 1729 | 2426 | 3805 | 1.57 | 10 | 12.2 |
| 5-2 | 8:2:1 | 1878 | 8.13 | 1582 | 1773 | 3008 | 1.69 | 20 | 25.0 |

Notes for Table 5: [a] molar polymerization ratio of TCD, NBES = 5-(triethyoxylsilyl)-2-norbornene, and AGE; [b] theoretical Mn based on polymerization ratio of TCD:NBES:AGE; [c] ratio of TCD and NBES calculated from $^1$H NMR; [d] Mn implied by $^1$H NMR ratio; [e] theoretical NBES content based on polymerization ratio; [f] NBES content by $^1$H NMR.

As can be seen, there is still control over the molecular weight despite the use of both functionalized comonomer and functionalized chain-transfer agents. Furthermore, the functionalized comonomer is incorporated at the targeted ratio for both experiments.

Example 6: Processability of TCD-co-1-hexene. In Run 6-1, a degassed solution of purified TCD (45.24 g, 44.36 mL. 282.3 mmol) in toluene (260 mL) was added to a 1 L three-neck round bottom flask and was equipped to a mechanical stirrer. 1-Hexene (2.37 g, 3.53 mL, 28.2 mmol) was added to the reaction flask and the flask was placed under a nitrogen atmosphere.

While stirring the reaction, Grubbs-3G Catalyst (25 mg; 0.028 mmol) dissolved in anhydrous toluene (10 mL) was added. The reaction was stirred at room temperature in glove box for 3 hours. After 3 hours, the Grubbs-3G catalyst was quenched by adding ethyl allyl ether (0.24 g, 0.03 mL, 0.28 mmol) in toluene (1 mL) to the reaction and allowing the reaction to stir for 30 minutes. The product was isolated by precipitation with isopropanol and dried (25.37 g) with a rotary evaporator. $^1$H NMR (CDCl$_3$) of the product was taken.

The $^1$H NMR analysis was primarily focused upon terminal vinyl signals (5.9 ppm; 5.4 ppm, 5.0 ppm), main chain alkene (5.5 ppm), and aliphatic signals from ring opened TCD (2.95 ppm, 2.68 ppm). The number of monomer repeats can be estimated from the combined terminal olefin (5H) signals, with either the main chain alkene (2H per monomer unit) or the combined aliphatic (2H per monomer unit). Both calculations estimated the number of monomer units to be roughly 6.15. As the molecular weight of TCD is 160 g/mol and the molecular weight of 1-hexene is 84 g/mol, this number of monomer units corresponds to an estimated Mn of 2,326 g/mol. GPC results (calibrated to polystyrene) gave Mn of 2,952 g/mol, Mw=5,482 g/mol, and Mw/Mn=1.86.

The Brookfield viscosity of the sample was measured according to the previously described method. It was found that at 250° C. the Brookfield viscosity was 4,700 cPs, at 240° C. the Brookfield viscosity was 6,525, at 230° C. the Brookfield viscosity was 13,775 cPs, and at 220° C. the Brookfield viscosity was 33,100 cPs.

In Run 6-2, a degassed solution of purified TCD (45.24 g, 44.36 mL. 282.3 mmol) in toluene (260 mL) was added to a 1 L three-neck round bottom flask and was equipped to a mechanical stirrer. 1-hexene (7.92 g, 11.77 mL, 94.1 mmol) was added to the reaction flask and the flask was placed under a nitrogen atmosphere.

While stirring the reaction, Grubbs-3G Catalyst (25 mg; 0.028 mmol) dissolved in anhydrous toluene (10 mL) was added. The reaction was stirred at room temperature in glove box for 3 hours. After 3 hours, the Grubbs-3G catalyst was quenched by adding ethyl allyl ether (0.24 g, 0.03 mL, 0.28 mmol) in toluene (1 mL) to the reaction and allowing the reaction to stir for 30 minutes. The product was isolated by precipitation with isopropanol and dried (5.37 g) with a rotary evaporator. The molecular weight distribution of the sample was measured with GPC and the $^1$H NMR (CDCl$_3$) was measured.

The $^1$H NMR analysis was primarily focused upon terminal vinyl signals (5.4 ppm, 5.0 ppm), main chain alkene (5.5 ppm), and aliphatic signals from ring opened TCD (2.95 ppm, 2.68 ppm). The number of monomer repeats can be estimated from the combined terminal olefin (4H) signals, with either the main chain alkene (2H per monomer unit) or the combined aliphatic (2H per monomer unit). Both calculations estimated the number of monomer units to be roughly 13.25. As the molecular weight of TCD is 160 g/mol and the molecular weight of 1-hexene is 84 g/mol, this number of monomer units corresponds to an estimated Mn of 2,204 g/mol. GPC results (calibrated to polystyrene) gave Mn of 1,910 g/mol, Mw=2,194 g/mol, and Mw/Mn=1.15.

The Brookfield viscosity of the sample was measured according to the previously described method. It was found that at 220° C. the Brookfield viscosity was 940 cPs, at 210° C. the Brookfield viscosity was 1,410, at 200° C. the Brookfield viscosity was 2,325 cPs, and at 190° C. the Brookfield viscosity was 4,938 cPs. Collectively, these results demonstrate the decreased viscosity—and hence the increased processability—of these low molecular weight oligomers relative to the known high molecular weight TCD polymers.

Example 7: Processability of TCD-co-allyltriethoxysilane. In Run 7-1, a degassed solution of purified TCD (45.24 g, 44.36 mL. 282.3 mmol) in toluene (260 mL) was added to a 1 L three-neck round bottom flask and was equipped to a mechanical stirrer. Allyltriethoxysilane (19.22 g, 21.29 mL, 94.1 mmol) was added to the reaction flask and the flask was placed under a nitrogen atmosphere.

While stirring the reaction, Grubbs-3G Catalyst (25 mg; 0.028 mmol) dissolved in anhydrous toluene (10 mL) was added. The reaction was stirred at room temperature in glove box for 3 hours. After 3 hours, the Grubbs-3G catalyst was quenched by adding ethyl allyl ether (0.24 g, 0.03 mL, 0.28 mmol) in toluene (1 mL) to the reaction and allowing the reaction to stir for 30 minutes. The product was isolated and dried (17.78 g) with a rotary evaporator. $^1$H NMR (CDCl$_3$) of the product was taken.

$^1$H NMR analysis was primarily focused upon terminal vinyl signals (5.9 ppm; 5.4 ppm; 4.9 ppm), main chain alkene (5.5 ppm), aliphatic signals from ring opened TCD (2.9 ppm, 2.7 ppm), and triethoxysilyl (3.85 ppm). The number of monomer repeats was estimated from the combined terminal olefin (5H) signals, with either the main chain alkene (2H per monomer unit) or the combined aliphatic (2H per monomer unit). Both calculations estimated the number of monomer units to be roughly 12.01 (based on calculation with aliphatic signal). The number of monomer units and the incorporation of functionalized CTA corresponds to an estimated Mn of 653 g/mol. GPC results (calibrated to polystyrene) give Mn of 2,162 g/mol, Mw=3,052 g/mol, and Mw/Mn=1.41.

The Brookfield viscosity of the sample was measured according to the previously described method. It was found that at 250° C. the Brookfield viscosity was 4,460 cPs, at 240° C. the Brookfield viscosity was 13,100, and at 230° C. the Brookfield viscosity was 36,300 cPs. These results demonstrate the decreased viscosity—and hence the increased processability—of these low molecular weight oligomers relative to the known high molecular weight TCD polymers.

Example 8 (Comparative): ROMP polymerization of TCD. In Run 8-1, a degassed solution of purified TCD (45.24 g, 44.36 mL. 282.3 mmol) in toluene (260 mL) was added to a 1 L three-neck round bottom flask and was equipped to a mechanical stirrer. The flask was placed under a nitrogen atmosphere.

While stirring the reaction, Grubbs-3G Catalyst (25 mg; 0.028 mmol) dissolved in anhydrous toluene (10 mL) was added. The reaction was stirred at room temperature in glove box for 3 hours. After 3 hours, the Grubbs-3G catalyst was quenched by adding ethyl allyl ether (0.24 g, 0.03 mL, 0.28 mmol) in toluene (1 mL) to the reaction and allowing the reaction to stir for 30 minutes. The product was isolated and dried (24.38 g) with a rotary evaporator.

Given the low concentration of vinyl end groups, the molecular weight of the polymer was not able to be estimated via $^1$H NMR. GPC results (calibrated to polystyrene) give Mn of 14,087 g/mol, Mw=52,556 g/mol, Mz=14,4957 g/mol, and Mw/Mn=3.73. We were unable to determine the Brookfield viscosity, as the sample did not liquefy during the measurement procedure. The inability of the polymer to liquefy highlights the improved processability of the oligomers.

What is claimed is:

1. A composition of matter comprising a functionalized oligomer obtained by ring opening metathesis polymerization (ROMP) of tetracyclododecene monomer and a sterically encumbered cyclic monomer with an olefinic chain transfer agent at a molar ratio of the tetracyclododecene monomer and the sterically encumbered cyclic monomer to olefinic chain transfer agent from 3:1 to about 40:1, wherein the olefinic chain transfer agent comprises allyl glycidyl ether, allyl Si(OEt)$_3$, allyl-CH$_2$—CH(O)CH$_2$, allyl-CH$_2$—N—(SiMe$_3$)$_2$, or a combination thereof, and wherein the sterically encumbered cyclic monomer comprises 5-trifluoromethyl-5,6,6-trifluoro-2-norbornene.

2. The composition of matter of claim 1, wherein the functionalized oligomer has an Mn determined by gel permeation chromatography calibrated to polystyrene of from about 8,000 g/mole to about 1,000 g/mole.

3. The composition of matter of claim 1, wherein the functionalized oligomer has an Mn determined by $^1$H NMR of from about 5,000 to 400 g/mole.

4. The composition of matter of claim 1, wherein the functionalized oligomer has Tg, determined by differential scanning calorimetry from a first heating scan, or from a second heating scan if the first heating scan Tg is obscured by an exotherm, from about 25° C. to about 180° C.

5. The composition of matter of claim 1, wherein the functionalized oligomer has an amorphous morphology and a cis/trans ratio greater than 0.10 and less than 0.95.

6. The composition of matter of claim 1, wherein a ratio of tetracyclododecene monomer units to sterically encumbered cyclic monomer units of the functionalized oligomer is between 4:1 and 9:1.

7. The composition of matter of claim 2, wherein the functionalized oligomer has an Mn determined by gel permeation chromatography calibrated to polystyrene of from about 2400 g/mole to about 1800 g/mole.

8. The composition of matter of claim 1, wherein the functionalized oligomer has an Mw determined by gel permeation chromatography calibrated to polystyrene of from about 3800 g/mole to about 3000 g/mole.

9. The composition of matter of claim 1, wherein the functionalized oligomer has an Mw/Mn determined by gel permeation chromatography calibrated to polystyrene of from about 1.5 to about 1.7.

10. The composition of matter of claim 1, wherein the functionalized oligomer comprises tetracyclododecene monomer units and sterically encumbered cyclic monomer units coupled together by an unsaturated backbone.

11. The composition of matter of claim 10, wherein the composition of matter is a reactive adhesive or sealant.

12. The composition of matter of claim 10, wherein the composition of matter is a sealant.

13. The composition of matter of claim 10, wherein the composition of matter is a tire.

14. The composition of matter of claim 1, wherein the molar ratio of the tetracyclododecene monomer and the sterically encumbered cyclic monomer to olefinic chain transfer agent is about 10:1.

15. The composition of matter of claim 14, wherein a molar ratio of the tetracyclododecene monomer to the sterically encumbered cyclic monomer to the olefinic chain transfer agent is about 9:1:1.

16. The composition of matter of claim 14, wherein a molar ratio of the tetracyclododecene monomer to the sterically encumbered cyclic monomer to the olefinic chain transfer agent is about 8:2:1.

17. The composition of matter of claim 14, wherein the functionalized oligomer has an Mw determined by gel permeation chromatography calibrated to polystyrene of from about 3800 g/mole to about 3000 g/mole.

18. The composition of matter of claim 14, wherein the functionalized oligomer has an Mw/Mn determined by gel permeation chromatography calibrated to polystyrene of from about 1.5 to about 1.7.

* * * * *